United States Patent
Mancosky

(10) Patent No.: US 9,469,548 B2
(45) Date of Patent: Oct. 18, 2016

(54) CONTINUOUS HYDRODYNAMIC CAVITATION CRYSTALLIZATION

(71) Applicant: Hydro Dynamics, Inc., Rome, GA (US)

(72) Inventor: Douglas George Mancosky, White, GA (US)

(73) Assignee: Hydro Dynamics, Inc., Rome, GA (US)

( * ) Notice: Subject to any disclaimer, the term of this patent is extended or adjusted under 35 U.S.C. 154(b) by 0 days.

(21) Appl. No.: 15/046,941

(22) Filed: Feb. 18, 2016

(65) Prior Publication Data

US 2016/0244334 A1    Aug. 25, 2016

Related U.S. Application Data

(60) Provisional application No. 62/118,941, filed on Feb. 20, 2015.

(51) Int. Cl.
*B01D 9/02* (2006.01)
*C01F 11/18* (2006.01)

(52) U.S. Cl.
CPC .................................. *C01F 11/181* (2013.01)

(58) Field of Classification Search
CPC ............ B01D 9/02; B01D 9/00; C13K 1/10; C30B 17/00
USPC ................................................ 23/295 R, 301
See application file for complete search history.

(56) References Cited

U.S. PATENT DOCUMENTS

| | | | |
|---|---|---|---|
| 1,758,207 A | 5/1930 | Walker | |
| 2,283,244 A | 5/1942 | Walker | |
| 4,213,332 A | 7/1980 | Bonomo et al. | |
| 4,626,319 A | 12/1986 | Kruger et al. | |
| 4,864,872 A | 9/1989 | Stahl | |
| 5,188,090 A | 2/1993 | Griggs | |
| 5,385,298 A | 1/1995 | Griggs | |
| 5,571,975 A | 11/1996 | Smith et al. | |
| 5,957,122 A | 9/1999 | Griggs | |
| 6,221,206 B1 | 4/2001 | Bokstrom et al. | |
| 6,627,784 B2 | 9/2003 | Hudson et al. | |
| 7,360,755 B2 | 4/2008 | Hudson et al. | |
| 7,507,014 B1 | 3/2009 | League et al. | |
| 8,430,968 B2 | 4/2013 | Mancosky et al. | |
| 8,465,642 B2 | 6/2013 | Kazem | |
| 9,162,160 B2 * | 10/2015 | Robinson | B01D 9/0054 |

FOREIGN PATENT DOCUMENTS

| | | |
|---|---|---|
| JP | 55-102491 | 8/1980 |
| JP | 60-226594 | 11/1985 |
| JP | 62-213895 | 9/1987 |

* cited by examiner

*Primary Examiner* — Edward Johnson
(74) *Attorney, Agent, or Firm* — Womble Carlyle Sandridge & Rice LLP

(57) ABSTRACT

A device and process for crystallizing a compound using hydrodynamic cavitation comprises the steps of mixing at least one stream of a feed stock solution containing the compound to be crystallized. The feed stock solution is caused to flow through the cavitation zone of a rotor-stator type hydrodynamic cavitation device. Cavitation events and resulting shock waves generated in the cavitation zone cause nucleation and the production of seed crystals within the solution. Possible recirculation of the solution through the cavitation device promotes crystallization at the sites of the seed crystals resulting in increasing larger crystals. The resulting crystalized compound can be extracted from the solution and used in product manufacturing and industrial processes. The rotor-stator design allows for high flow rates, high applied energy and robust service with minimized wear.

16 Claims, 2 Drawing Sheets

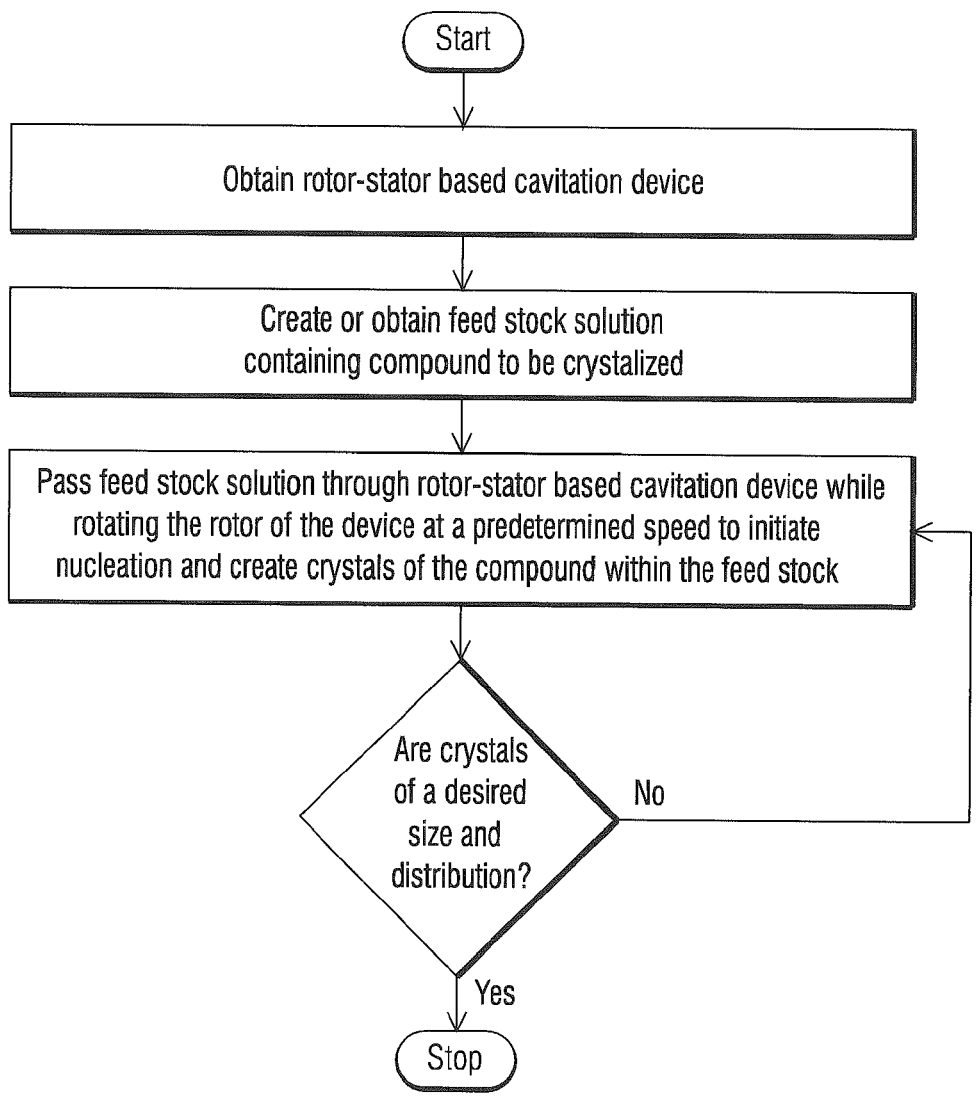

CONTINUOUS HYDRODYNAMIC CAVITATION CRYSTALLIZATION

REFERENCE TO RELATED APPLICATION

Priority is hereby claimed to the filing date of U.S. provisional patent application 62/118,941 filed on Feb. 20, 2015, the entire contents of which is hereby incorporated by reference.

TECHNICAL FIELD

This disclosure relates generally to crystallization of compounds and more particularly to the creation of seed crystals in a compound to be crystalized by subjecting a flow of the compound at high rates to cavitation in a low shear environment.

BACKGROUND

Crystallization of compounds from solution is a separation and purification method used in the chemical, food, and pharmaceutical industries, particularly for the production of active compounds or their intermediates. Some of the goals of the crystallization process include producing a product meeting a desired purity level and also a product having the desired crystal size and size distribution. Crystallization from solution may be conducted as a batch process or as a continuous process. Batch crystallization equipment and operation is fairly simple but requires a significant investment of both time and money between batches. Additionally, batch crystallization suffers from quality control issues due to the lack of a steady state during the batch crystallization process. Continuous crystallization may be used for large volume commodity type materials with loose tolerances. This is because continuous crystallization does not typically permit adequate quality control to yield crystals suitable for use in industries demanding a high level of crystal size and size distribution control. U.S. Pat. No. 7,314,516 describes one apparatus and method that illustrates such a continuous crystallization process and the disclosure of this patent is hereby incorporated by reference.

One standard crystallization procedure involves contacting a supersaturated solution of a compound to be crystallized with an appropriate "anti-solvent" in a stirred vessel. Within the stirred vessel, the anti-solvent initiates primary nucleation which leads to crystal formation, sometimes with the help of seeding, and crystal digestion during an aging step. Mixing within the vessel can be achieved with a variety of agitators (e.g., Rushton or Pitched blade turbines, Intermig, etc.), and the process is done in a batchwise fashion.

Another known crystallization procedure for homogenous fluids employs temperature variation in a solution of a compound to be crystallized in order to generate a super saturation of the compound in the solution. Crystallization can then proceed from the super saturated solution.

It has been well known that ultrasound and cavitation can assist in nucleation of a compound within a fluid, although the mechanism is not completely agreed upon or understood. Subjecting a compound to be crystallized to cavitation energy is also known for generating nucleation sites and crystals of substantially uniform size. This is due, some think, to the high pressures and temperatures to which the compound is subjected in the immediate vicinity of the locations of cavitation bubble collapse.

A need exist for a continuous nucleation crystallization device and method that is capable of high throughput rates for extended periods of time yet that can produce nucleation and crystallization that is controllable and predictable. It is to the provision of such a device and method that the present invention is primarily directed.

SUMMARY

Briefly described, an apparatus and associated method are disclosed for creating nucleation and crystallization in a flow of feed stock solution. More specifically, an apparatus and method are disclosed for crystallizing a compound using hydrodynamic cavitation induced within a cavitation zone between a spinning rotor and the outer wall (or another wall) of a cylindrical cavity or stator within which the rotor spins. The method includes the steps of mixing at least one stream of a feed solution of such compound to be crystallized and passing the stream through the cavitation zone between the spinning rotor and outer cavity wall of a hydrodynamic cavitation device. The surface of the rotor is provided with a multitude of shallow radial bores (or other cavitation producing features) and the movement of these bores induces intense cavitation events in the solution within the bores. The energy and pressure of the cavitation events within the flow of feed stock solution causes nucleation and the production of seed crystals. Repeat cycling of the flow through the cavitation zone of the device can cause further crystallization of the compound within the flow.

The rotor-stator design of the cavitation device allows for high flow rates of the feed stock, the ability to subject the flow to very high energy from cavitation events, and robust service with minimized wear. Further, the device operates continuously at high flow rates making the apparatus and method of this invention suitable for crystallization of compounds within a feed stock solution at commercially desirable flow rates. Finally, the process can be tuned to provide highly reliable results to yield crystals suitable for use in industries demanding a high level of crystal size and size distribution control while still providing continuous high flow rates. The process is aided by the low shear environment of the cavitation zone, which tends to stabilize the forming nucleation seeds and crystals. These and other features, aspects, and advantages will become more apparent upon review of the detailed description set forth below taken in conjunction with the attached drawing figure, which is briefly described as follows.

BRIEF DESCRIPTION OF THE DRAWINGS

FIG. 2 is a flowchart illustrating one embodiment of the methodology of the invention.

DETAILED DESCRIPTION

Figure 1:
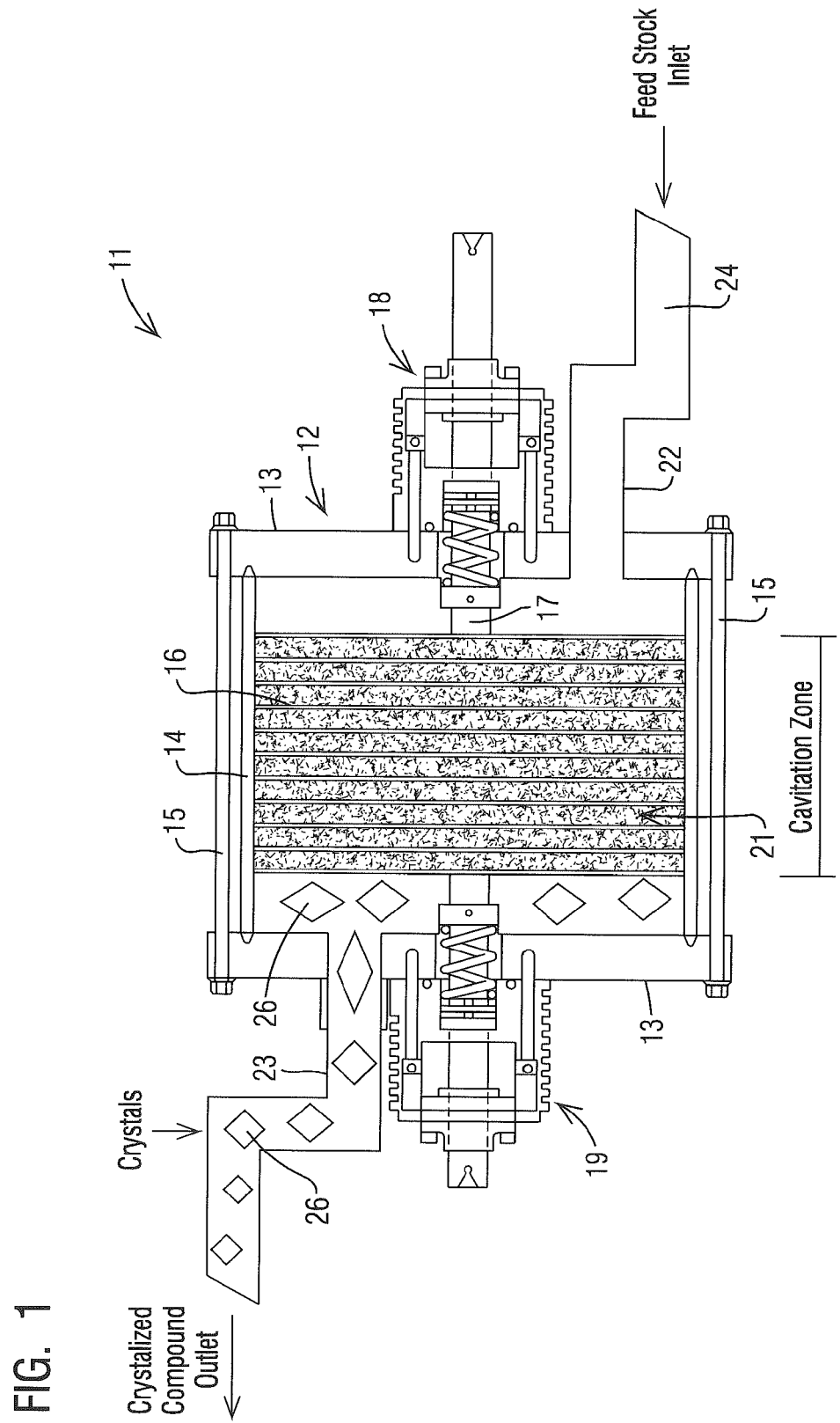
FIG. 1 is a cut-away drawing showing an apparatus for generating nucleation and crystallization in a flow of feed stock solution according to one aspect of the invention.

Embodiments of an apparatus for carrying out the methodology of the invention can take on various forms including those disclosed in U.S. Pat. Nos. 8,465,642; 8,430,968; 7,507,014; 7,360,755; 6,627,784; 5,957,122; and 5,385,298, all of which are owned by the assignee of the present invention and each of which is hereby incorporated by reference in its entirety. With the disclosures of these incorporated patents in mind, the method and apparatus of the present invention will be described generally with reference to the annexed drawing figures, wherein reference numerals indicate corresponding parts of the apparatus and steps of the method.

FIG. 1 shows in partially cutaway and simplified fashion one embodiment of an apparatus 11 for carrying out the methodology of the present invention. The apparatus 11 comprises, in this exemplary embodiment, a cylindrical housing 12 formed of opposed end plates 13 joined by a cylindrical outer wall 14, all held together with circumferential bolts 15. A cylindrical rotor 16 is disposed within the housing 12 and the rotor 16 is rotatably mounted on a shaft 17 that, in turn, is journaled within appropriate bearings 18 and 19. The shaft 17 is coupled to an electric motor (not shown) that, when activated, rotates the rotor within the housing at a relatively high rotation rate. As disclosed in detail in the incorporated patents, the rotor 16 is sized such that a cylindrical space is defined between the peripheral surface of the rotor and the inside surface of the cylindrical outer wall 14. This space is referred to herein as the cavitation zone 21.

A fluid inlet 22 communicates with the interior of the housing 12 on one side of the rotor 16 and a fluid outlet 23 communicates with the interior of the housing 12 on the opposite side of the rotor. Other inlet and outlet arrangements are possible. For example, inlets can be formed through the sides while outlets can be formed through the cylindrical outer wall, or vice versa. In one embodiment inlets and outlets are both formed through the cylindrical outer wall and preferably are oriented generally tangentially thereto. Such an embodiment, referred to as tangential inlets and outlets, can be beneficial, particularly where a fluid being treated is abrasive. In such a scenario, the tangential inlets and outlets reduce sharp turns within the fluid, which can result in erosion of surfaces within the apparatus.

A feed stock solution containing a compound to be crystalized may be fed into the housing through the inlet 22. The solution then moves to the periphery of the housing, travels through the cavitation zone 21, and exits the housing through outlet 23. The placement of the inlet and outlet is such that all of the fluid introduced through the inlet 22 must pass through the cavitation zone 21 before exiting the housing through the outlet 23. In a tangential inlet and outlet configuration, for instance, the inlet may be located between rotors of a split rotor cavitator and the outlets located outboard of each of the rotors. Other configurations are possible.

A plurality of holes or bores is formed through the outer surface of the rotor in the illustrated embodiment. Rotation of the rotor with a fluid present in the housing induces violent cavitation in the fluid within the bores of the rotor. More specifically, cavitation bubbles are continuously created in fluid within the bores and continuously collapse within the bores. The collapsing cavitation bubbles generate intense localized shockwaves that travel from the bores through the fluid within the cavitation zone. The collapsing cavitation bubbles also generate heat within the fluid by exciting the molecules of the fluid. The ultimate result is that fluid within the cavitation zone is heated by the cavitation and subjected to intense shockwaves that travel throughout the fluid flowing through the cavitation zone.

It has been found that subjecting a solution containing the compound to be crystalized to the high energy of the shockwaves within the solution efficiently and continuously generates small seed crystals of the compound suspended in the fluid, a process known as nucleation. Once seed crystals are generated, additional molecules of the compound can attach themselves to the seed crystals thereby forming larger and larger crystals. Due to the violent activity throughout the cavitation zone, the seed crystals become uniformly disbursed throughout the feed stock solution, a condition that is highly desirable especially in the manufacture of products sensitive to crystal size and distribution. Furthermore, the level of shear forces to which the crystals are subjected in the cavitation zone is very low as a result of the relatively large clearance between the outer surface of the rotor and the inner wall of the housing. This is important because subjecting newly formed crystals to shear can break apart the crystals thereby negating the advantageous crystallization that results from the process of this invention.

Once seed crystals are generated, the feed stock solution can be directed from the apparatus 11 to a process tank where the seed crystals grow into larger and larger crystals through molecular attachment. However, this is not considered the most efficient and controllable technique for growing the crystals or maintaining a uniform crystal distribution. More preferably, after a first pass through the apparatus 11 to generate seed crystals through nucleation, the feed stock solution containing the compound to be crystalized is cycled back through the apparatus 11 or a like apparatus located downstream. This both maintains a uniform distribution of seed crystals within the feed stock and promotes growth of crystals around the seed crystals by subjecting the feed stock again to the high energy environment within the cavitation zone.

The feed stock solution can be recycled through the apparatus 11 or successive like apparatuses until the crystals entrained within the feed stock solution flow are of a desired size for a particular application and are uniformly distributed throughout the feed stock solution. In this way, the crystal size and distribution can be carefully controlled to produce crystallization of the compound within the fluid with a precision that previously has required small batch processing, but on a large and continuous scale useful in commercial production.

FIG. 2 is a flowchart showing the steps of the present methodology in one preferred form thereof. First, a rotor-stator based cavitation device is obtained. One suitable device is the Shockwave Power Reactor (SPR) device available from Hydro Dynamics, Inc. of Rome, Ga. Next, an appropriate feed stock solution is created or obtained with the feed stock being in liquid form and containing the compound that is desired to be crystalized. The feed stock is passed through the rotor-stator based cavitation device while the rotor of the device is rotated at a predetermined rotation rate. This generates the aforementioned cavitation zone and the feed stock solution containing the compound moves through the cavitation zone as it passes through the rotor-stator based cavitation device. Within the cavitation zone, nucleation of the compound is induced in the feed stock to produce seed crystals and crystallization begins to take place at the sites of the seed crystals to grow larger crystals. The process gradually forms crystals of the compound within the feed stock solution. After passing through the rotor-stator based cavitation device, the feed stock is examined to determine whether the crystals that have been generated are of a desired size and distribution within the feed stock solution. If not, the feed stock solution may be passed again through the rotor-stator based cavitation device to induce further nucleation and crystal growth through crystallization. Once the crystals within the feed stock solution are of a desired size and distribution, the circulation can be discontinued and the crystals can be extracted and/or used for their intended purpose.

Sometimes nucleation and crystallization is desired in an abrasive mixture or with abrasives entrained within a flow. Petroleum waste water and inorganics in mining are common examples, but there are many others. Initiating nucleation and crystallization in such environments is difficult or impossible with traditional techniques. With the present invention, however, nucleation and crystallization is easily accomplished for compounds in abrasive fluids or fluids with entrained abrasives. The ability to accomplish this can be enhanced by replacing the side inlet and outlet shown in FIG. 1 of the apparatus with inlets and outlets that inject and withdraw fluid through the cylindrical wall of the housing in a direction tangential or substantially tangential to the direction of rotation of the rotor.

EXAMPLE

The production of Calcium Carbonate crystals was performed by mixing calcium oxide, water, and carbon dioxide to form a feed stock solution. The water is added to produce calcium hydroxide, and the carbon dioxide is introduced in this solution to precipitate the desired calcium carbonate, referred to in the industry as precipitated calcium carbonate (PCC). The calcium carbonate, water, and carbon dioxide solution was passed through a cavitation device such as that disclosed herein to form seed crystals through nucleation and the resulting solution was cycled again through a cavitation device to grow crystals of calcium carbonate around the seed crystals through crystallization. It was found that ultimate crystal size can be controlled quite precisely at high commercial flow rates by varying rotor-stator rpm and thus varying the amount of energy to which the feed stock is subjected within the cavitation zone. The reactions taking place within the cavitation zone were:

$$CaO + H_2O \rightarrow Ca(OH)_2$$

and $$Ca(OH)_2 + CO_2 \rightarrow CaCO_3 + H_2O$$

The resulting crystallization was found upon inspection to have produced crystals of uniform in size and uniform distribution throughout the solution.

The invention has been described herein in terms of preferred embodiments and methodologies considered by the inventor to represent the best modes of carrying out the invention. It will be understood by those of skill in the art, however, that a wide gamut of additions, deletions, and modifications, both subtle and gross, might well be made to the embodiments illustrated herein without departing from the spirit and scope of the invention. All such additions, deletions, and modifications are considered and should be construed to be within the scope of the invention exemplified in this disclosure.

What is claimed is:

1. A method of crystallizing a compound within a solution using controlled hydrodynamic cavitation, the method comprising the steps of:
    obtaining a cavitation apparatus having an inlet, an outlet, and an internal cavitation zone;
    causing the solution to flow through the cavitation apparatus in such a way that the solution moves through the cavitation zone;
    generating cavitation within the solution in the cavitation zone to induce nucleation of the compound to form seed crystals;
    distributing the seed crystals substantially uniformly throughout the solution;
    promoting crystallization of the compound around the seed crystals to produce crystals within the solution; and
    separating the crystals from the solution.

2. The method of claim 1, wherein the compound to be crystallized is an inorganic material.

3. The method of claim 1, wherein the compound to be crystallized is an organic material.

4. The method of claim 1 wherein the step of promoting crystallization of the compound comprises recycling the solution through the cavitation device.

5. The method of claim 1 further comprising the step of modifying the temperature of the solution within the cavitation device to control the rate of nucleation and cavitation.

6. The method of claim 1 wherein the step of promoting crystallization of the compound comprises moving the solution through a second cavitation device after seed crystals are formed in the solution.

7. The method of claim 1 wherein the compound comprises calcium carbonate.

8. The method of claim 1 further comprising the step of controlling the rate of flow of the solution through the cavitation device to control nucleation and crystallization.

9. The method of claim 1 wherein the step of distributing the seed crystals comprises subjecting the seed crystals to cavitation induced shock waves within the cavitation zone.

10. The method of claim 1 further comprising the step of adjusting the temperature of the solution prior to generating cavitation events in the solution to super saturate the solution with the compound.

11. The method of claim 10 wherein the step of adjusting the temperature comprises lowering the temperature.

12. A method of crystalizing calcium carbonate comprising the steps of:
    mixing calcium oxide with water and carbon dioxide to form a feed stock solution;
    moving the feed stock solution through a cavitation zone at a predetermined rate;
    generating cavitation events within the solution in the cavitation zone, the cavitation events creating energetic shock waves that propagate through the solution;
    the energetic shock waves promoting nucleation of calcium carbonate seed crystals within the solution;
    distributing the seed crystals substantially uniformly throughout the solution;
    promoting crystallization of calcium carbonate at the sites of the seed crystals to form calcium carbonate crystals;
    monitoring the size and distribution of crystals formed in the solution;
    discontinuing the crystallization of calcium carbonate within the solution when the crystals formed in the solution reach a predetermined size and a predetermined distribution in the solution; and
    extracting the calcium carbonate crystals from the solution for use.

13. The method of claim 12 wherein the step of distributing the seed crystals substantially uniformly throughout the solution comprises subjecting the seed crystals to cavitation induced shockwaves within the cavitation zone.

14. The method of claim 12 wherein the step of promoting crystallization of calcium carbonate comprises recirculating the solution and seed crystals through the cavitation zone.

15. The method of claim 12 further comprising reducing the temperature of the solution to supersaturate the solution.

16. A method of inducing controllable nucleation and crystallization of a compound within a solution to produce crystals of the compound having a predetermined size range and a predetermined distribution throughout the solution, the method comprising the steps of:
  (a) establishing a treatment zone within a controlled cavitation reactor, the treatment zone having a dimension that results in relatively low shear when the solution is moved through the treatment zone at a predetermined rate;
  (b) passing the solution through the treatment zone at or below the predetermined rate to minimize shear within the solution;
  (c) inducing cavitation events in the solution within the treatment zone to cause energetic shockwaves to move through the solution to promote nucleation and consequent formation of seed crystals in the compound within the solution;
  (d) distributing the seed crystals substantially uniformly throughout the solution;
  (e) promoting crystallization within the solution wherein crystals of the compound grow larger at the sites of the seed crystals;
  (f) observing the size and distribution of the crystals within the solution;
  (g) discontinuing crystallization of the compound within the solution when the crystals reach a size within a predetermined range and a predetermined distribution throughout the solution.

* * * * *